United States Patent [19]

Hintz

[11] Patent Number: 5,736,240
[45] Date of Patent: *Apr. 7, 1998

[54] AMORPHOUS RARE EARTH OXIDES

[75] Inventor: Michael B. Hintz, Mahtomedi, Minn.

[73] Assignee: Minnesota Mining and Manufacturing Company, St. Paul, Minn.

[*] Notice: The term of this patent shall not extend beyond the expiration date of Pat. No. 5,478,456.

[21] Appl. No.: 550,570

[22] Filed: Oct. 31, 1995

Related U.S. Application Data

[63] Continuation of Ser. No. 130,294, Oct. 1, 1993, abandoned.
[51] Int. Cl.⁶ ............................................. G11B 5/66
[52] U.S. Cl. ................. 428/332; 428/336; 428/694 ML; 428/694 DE; 428/684 NF; 428/694 XS; 428/900; 423/266; 423/233; 423/275; 204/192.2; 204/192.22
[58] Field of Search ................ 423/266, 233, 423/275; 428/332, 336, 694 ML, 694 DE, 694 NF, 694 XS, 900; 204/192.2, 192.22

[56] References Cited

U.S. PATENT DOCUMENTS

| | | | |
|---|---|---|---|
| 3,117,372 | 1/1964 | McNees | 29/527.1 |
| 4,333,808 | 6/1982 | Bhattacharyya et al. | 204/192.22 |
| 4,502,983 | 3/1985 | Omori et al. | 252/516 |
| 4,564,490 | 1/1986 | Omori et al. | 264/682 |
| 4,680,742 | 7/1987 | Yamada et al. | 369/13 |
| 4,822,675 | 4/1989 | Funkenbusch et al. | 428/336 |
| 4,917,970 | 4/1990 | Funkenbusch | 428/694 ML |
| 4,923,829 | 5/1990 | Yasutomi et al. | 501/95.3 |
| 4,954,232 | 9/1990 | Yamada et al. | 204/192.23 |
| 5,004,709 | 4/1991 | Stranford et al. | 501/97.2 |
| 5,104,830 | 4/1992 | Drouet et al. | 428/699 |
| 5,298,470 | 3/1994 | Chia et al. | 501/89 |
| 5,478,456 | 12/1995 | Humpal et al. | 204/192.13 |

FOREIGN PATENT DOCUMENTS

| | | |
|---|---|---|
| 2019720 | 1/1991 | Canada . |
| 0 239 974 | 10/1987 | European Pat. Off. . |
| 0 415 449 | 3/1991 | European Pat. Off. . |
| 0 439 737 | 8/1991 | European Pat. Off. . |
| 63-133336 | 6/1988 | Japan . |
| 01-173457 | 7/1989 | Japan . |
| 01-196752 | 8/1989 | Japan . |
| 3-183765 | 8/1991 | Japan . |

OTHER PUBLICATIONS

"Amorphous $ZrO_2$–$Al_2O_3$ Oxide for Dielectric and Passivation Layers in Magneto–Optic Recording Media," *Research Disclosure*, Nov., 1991, p. 887.

"The Optical Properties of Evaporated $Y_2O_3$ Films," Bezuidenhout et al., *Thin Solid Films*, 139, (1986), pp. 121–132.

"Plasma assisted ion plating deposition of optical thin films for coatings and integrated optical applications," Varasi et al., *Vacuum*, vol. 36, Nos. 1–3, (1986), pp. 143–147.

"Structural characterization of yttrium oxide thin films using transmission electron microscopy," Krakauer et al., *Journal of Materials Science Letters 5*, (1986), pp. 667–670.

"Reactively Evaporated Films of Scandia and Yttria," Heitmann, *Applied Optics*, vol. 12, No. 2, Feb. 1973, pp. 394–397.

*Primary Examiner*—Leszek Kiliman
*Attorney, Agent, or Firm*—Eric D. Levinson

[57] ABSTRACT

A stable amorphous rare earth oxide, such as $Y_2O_3$, including a stabilizer, such as carbon, silicon carbide, or hafnium oxide. The stable amorphous rare earth oxide can be used in a dielectric layer in a magneto-optical recording medium.

25 Claims, 6 Drawing Sheets

AMORPHOUS RARE EARTH OXIDES

This is a continuation of application Ser. No. 08/130,294 filed Oct. 1, 1993 now abandoned.

FIELD OF THE INVENTION

This invention relates to amorphous materials.

BACKGROUND OF THE INVENTION

Magneto-optic recording media are used to store data and typically consist of a number of layers. For one common media construction, a first dielectric film, a magneto-optical film, a second dielectric film, and a reflector film are deposited successively on a transparent substrate.

The magneto-optical film—the layer which actually stores the information—consists of a magnetic material, which is often a rare earth-transition metal alloy. The magnetic material has its easy axis of magnetization perpendicular to the film plane. Data is stored on the film by locally heating specific film locations in the presence of an externally applied magnetic field. The local, rapid heating is generally accomplished by scanning a focussed laser beam along the media surface and modulating the laser beam power. The applied magnetic field is typically in the 50–400 Oe range, which is insufficient to reverse MO layer magnetization at low (ambient) temperatures. The magnetic field required to reverse MO layer magnetization is, however, a strong function of temperature, and becomes smaller than the applied field at some elevated temperature produced by the laser beam exposure. The applied field can therefore reverse regions of the films heated above some threshold recording temperature, thereby recording information.

Readout of recorded information is accomplished by scanning the media with a linearly polarized focussed laser beam at a reduced power level, so that the local heating is insufficient to cause magnetization reversal. The polarization state of the reflected light is altered in a manner which depends upon the magnetization direction of the scanned region. Use of suitable optical detection techniques allows determination of the local magnetization direction, thereby enabling reproduction of the recorded information.

The dielectric films protect the magneto-optical layers and should be stable to the environment and unreactive with the magnetic material used in the magneto-optical film. In addition, the dielectric film should have a refractive index with a real component, n, within some optimal range between the refractive index of the transparent substrate and the magneto-optical film to provide proper coupling of the light beams used to record and read data; furthermore, the imaginary component, k, of the refractive index should be small to minimize signal attenuation. Examples of materials that have been used in dielectric films include SiOx (where $1 \leq x \leq 2$), SiC, SiOAlN, $Si_3N_4$ and ZnS.

SUMMARY OF THE INVENTION

The invention features amorphous rare earth oxides that have a small imaginary refractive index component throughout the visible wavelength range and exhibit good amorphous phase stability and low chemical reactivity when in contact with magnetic materials commonly included in magneto-optical media construction. Because of these properties, the amorphous rare earth oxides are particularly suitable for use in dielectric films in magneto-optical recording media. Magneto-optical recording media including dielectric films made from the amorphous rare earth oxides exhibit good read/write performance characteristics.

The preferred amorphous rare earth oxides include an additive, such as silicon carbide, that stabilizes the rare earth oxide in its amorphous state. Preferred compositions include at least 70% by volume of the rare earth oxide and less than 30% by volume of the stabilizer.

As used herein, the term "rare earth oxide" includes, but is not limited to, $Y_2O_3$, $La_2O_3$, $Tb_2O_3$, $CeO_x$ ($1 \leq x \leq 1.5$), $Gd_2O_3$, $Dy_2O_3$, $Ho_2O_3$, $Sc_2O_3$, $Er_2O_3$, and $Yb_2O_3$.

Preferably, the amorphous rare earth oxides are produced via a physical vapor deposition process. The preferred physical vapor deposition process is magnetron sputtering with greater than 50% of the total discharge power supplied from a D.C. power supply. This process provides an efficient and consistent method for producing dielectric films consisting of the amorphous rare earth oxides. Advantageously, the rare earth oxides are sufficiently stable that they can often be deposited by non-reactive sputtering processes and still possess excellent optical properties such as an imaginary component of refractive index, k, of less than 0.03 throughout the 450 nm to 800 nm wavelength range.

The term "non-reactive sputtering process," as used herein, means a sputtering process in which more than 99.95% of the total process gases employed during film deposition consist of the inert gases He, Ne, Ar, Kr, and Xe.

The term "amorphous rare earth oxide," as used herein, means a composition including at least 51% by volume of a rare earth oxide that, when examined by transmission electron microscopy, exhibits a diffuse halo electron diffraction pattern and contains substantially no observable crystallites larger than 2 nm average size.

The term "stable," as used herein, means that a 10 degrees $\leq 2\theta \leq 60$ degrees X-ray diffraction scan using copper K-alpha incident radiation of a $\approx 100$ nm thick (rare earth oxide) film deposited upon a $\approx 5$ nm TbFeCo film exhibits no peaks corresponding to a crystalline phase of the rare earth oxide constituent(s) after annealing at 300° C. for one hour in air.

Other features and advantages of the invention will be apparent from the description of the preferred embodiments thereof, and from the claims.

BRIEF DESCRIPTION OF THE DRAWINGS

The figures will be described first.

DETAILED DESCRIPTION

Figure 1:
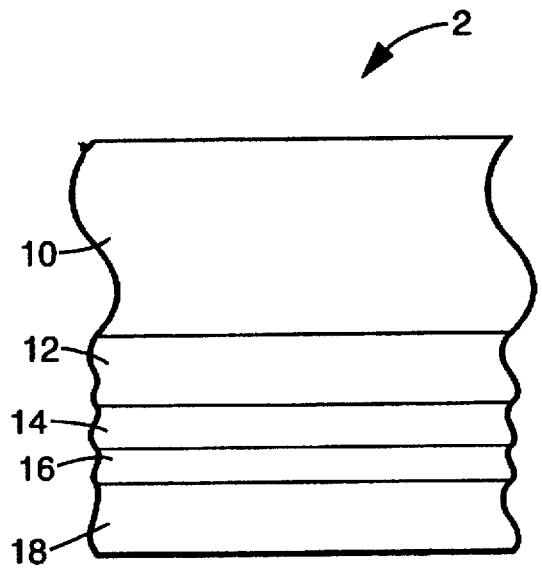
FIG. 1 is a schematic edge view of a magneto-optic recording medium including two dielectric films made of an amorphous rare earth oxide.

Referring to FIG. 1, magneto-optical recording medium 2 includes a transparent substrate 10, a first dielectric film 12, a magneto-optical film 14, a second dielectric film 16, and a reflecting film 18.

Transparent substrate 10 provides support for the recording medium. Transparent substrates suitable for use in magneto-optic recording media are known to those skilled in the art. Examples include polycarbonate substrates, amorphous polyolefins, and glass.

First dielectric film 12 most preferably is a stable amorphous $Y_2O_3$ film. The dielectric film should allow good passage of light between transparent substrate 10 and magneto-optical film 14. Preferably the dielectric film has a refractive index with a real component of between 1.7 and 2.4, and a imaginary component of less than 0.03. Preferred dielectric films typically have a thickness of between 5 nm and 200 nm, and more preferably from 50 to 100 nm.

Dielectric film 12 preferably includes a stabilizer which helps maintain the rare earth oxide in a stable amorphous state. Examples of suitable stabilizers include silicon, carbon, silicon carbide, GeFeCo, TbFeCo, FeCo, $Al_2O_3$, $HfO_2$, $ZrO_2$, $TiO_2$, and $SiN_x$ where $0.5 \leq X \leq 1.35$. Sufficient stabilizer should be included to perform this function, but not so much that the transmission properties of the dielectric film are substantially altered. Preferred dielectric films include between about 2% and 49%, and more preferably between about 3% and 30%, of the stabilizer by volume.

Magnetic materials suitable for use as magneto-optical film 14 are well-known to those skilled in the art. The preferred magnetic materials are rare earth-transition metal alloys like FeTb, FeTbCo, FeTbDyCo, FeTbNdCo, and CoPt or CoPd layered structures. Preferred magneto-optical films have a thickness of between 14 nm and 100 nm.

The second dielectric film 16 is also preferably comprised of a stable amorphous rare earth oxide. Amorphous rare earth oxide materials with a real refractive index component ranging from 1.5 to 2.4 and, preferably, an imaginary refractive index component of less than 0.03 are suitable for this application. Preferred second dielectric films have thicknesses ranging from 5 to 100 nm.

Reflective film 18 may comprise Al, Al alloys, Ag, Cu, Au, Pt or other metallic materials and their mixtures. The thickness of reflective film 18 typically ranges from about 30 nm to 200 nm. In practice, the thicknesses of first dielectric film 12, magneto-optical film 14, second dielectric film 16 and reflective film 18 are chosen to adjust media properties such as reflectivity, Kerr rotation, Kerr ellipticity, write power threshold and the like to values suitable for the particular media application as is well known in the optical recording art.

Recording medium 2 is prepared by depositing dielectric film 12 on substrate 10; then depositing magneto-optical layer 14 on dielectric film 12; then depositing dielectric film 16 on magneto-optical film 14; and then depositing reflective film 18 on dielectric film 16.

The present invention will now be further illustrated with reference to the following non-limiting Examples (all measurements approximate).

Examples 1–4 are recording media including dielectric films made of an amorphous rare earth oxide.

EXAMPLE 1

A magneto-optical recording medium was prepared using an injection-molded polycarbonate substrate having a 1.6 μm track pitch and the 512 byte/sector format as per the ISO specification for 130 mm erasable optical media. A four layer thin film structure was deposited on the substrate which consisted of, in order, a 85 nm thick first dielectric film composed of amorphous $Y_2O_3$ containing $\approx 3$ vol. % GdFeCo as the stabilizer; a 23 nm thick magneto-optical film of FeTbCo; a 12 nm thick second dielectric film having the same composition as the first dielectric film; and a 100 nm thick reflector film composed of aluminum containing 3.7 wt. % Cr.

A physical vapor deposition system with ion beam deposition and magnetron sputtering capabilities and a base pressure of less than $1 \times 10^{-7}$ torr was used to prepare the example. Ion beam deposition with a xenon primary beam of 225 Ma at 900V was used to prepare the dielectric and reflector films. The background pressure during dielectric and reflector deposition was $2.7 \times 10^{-4}$ torr of Xe and the deposition rate for both film types was $\approx 3$ nm/min. The dielectric films were prepared by sequential deposition from $Y_2O_3$, Gd and Fe-20 at. % Co targets. An Al-3.7 wt. % Cr target was used to prepare the reflector film. The FeToCo MO film was deposited from an alloy target by D.C. magnetron sputtering using an argon $\approx 12$ vol. % Xe mixture at pressure of $5 \times 10-3$ torr. The magneto-optical film has a Curie temperature Tcurie $\approx 220$ C.

Figure 2:
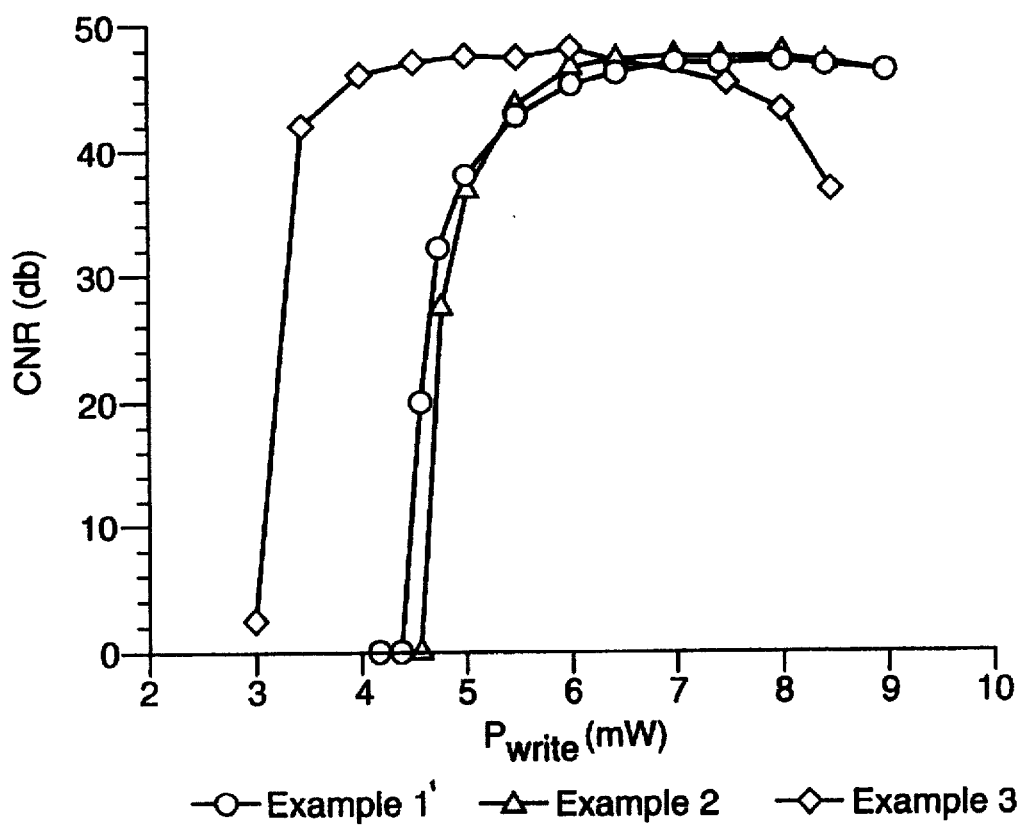
FIGS. 2 and 3 are plot of the carrier-to-noise ratio exhibited by examples of magneto-optical recording media including amorphous rare earth oxide dielectric films.

Referring to FIG. 2, the carrier-to-noise ratio data exhibited by the recording medium are plotted as a function of the write power. The following record parameters were used (for Examples 1–3): record frequency, 3.7 MHz; surface velocity, 5.65 M/s; pulse width, 70 ns; $H_{write}$, 250 Oe; $H_{erase}$, $-250$ Oe; and $P_{read}$, 1 mW.

EXAMPLE 2

A magneto-optical recording medium was prepared that included a polycarbonate substrate substantially identical to that used in Example 1; a first, 93 nm thick dielectric film composed of amorphous $Y_2O_3$ containing 20 vol. % silicon carbide as the stabilizer; a 20 nm thick FeTbCo magneto-optical film; a second, 14 nm thick dielectric film having the same composition as the first dielectric film; and a 100 nm thick reflective film composed of Al containing 3.7 wt. % Cr. Magnetron sputtering was used to prepare all film layers in this recording medium.

The first amorphous $Y_2O_3$ film was prepared by cosputtering from $Y_2O_3$ and silicon carbide targets; the $Y_2O_3$ target was driven by an R.F. power supply, while a conductive silicon carbide target, as described in U.S. Pat. No. 4,917,970, which is hereby incorporated by reference, was driven by a D.C. power supply. An argon working gas pressure of $2 \times 10^{-3}$ torr was maintained during deposition.

The FeTbCo film was deposited on the first dielectric film by D.C. magnetron cosputtering from elemental Fe, Co, and Tb targets at an Ar pressure of $5 \times 10^{-3}$ torr. The second amorphous $Y_2O_3$ film was then deposited by the same procedures used to deposit the first amorphous $Y_2O_3$ film. Finally, the Al-Cr reflective layer was deposited from an alloy target at $2 \times 10^{-3}$ torr of Ar.

Referring to FIG. 2, the carrier-to-noise ratio data exhibited by the recording medium are plotted as a function of the write power.

EXAMPLE 3

A magneto-optical recording medium was prepared that included a polycarbonate substrate substantially identical to that used in Example 1; a first, 85 nm thick dielectric film composed of amorphous $Y_2O_3$ containing silicon carbide as the stabilizer; a 23 nm thick FeTbCoTa magneto-optical film; a second, 13 nm thick dielectric film having the same composition as the first dielectric film; and a 65 nm thick reflective film composed of Al containing 3.7 wt. % Cr.

The recording medium was prepared by depositing the amorphous $Y_2O_3$ film on the polycarbonate substrate by D.C. magnetron sputtering a $Y_2O_3$-10 wt. % SiC conductive target in a $1\times10^{-3}$ torr Ar working gas atmosphere. Nonreactive D.C. magnetron sputtering of the amorphous $Y_2O_3$ dielectric films is more preferred because it is more efficient, results in higher deposition rates, results in better film-substrate adhesion, and is generally a less complicated process to implement in comparison with reactive and R.F. magnetron deposition processes.

The following procedure was used to prepare a conductive target comprising yttria+10% by weight silicon carbide (based upon the combined weight of yttria and silicon carbide and corresponding to 14.8% by volume). About 157.50 grams of yttria (average particle size 5.0 μm), about 17.50 grams of silicon carbide (average particle size 0.7 μm), about 8.32 grams of phenolic resin, and about 8.32 grams of anhydrous glycerol were ball milled together in ethanol for about 1 hour at about 96 rpm using a 1 liter polyethylene jar and about 1200 grams of high-alumina media. Suitable yttria is available as yttria 5600 from Molycorp, Inc., White Plains, N.Y. Suitable silicon carbide is available as CARBOGRAN UF-15 from Lonza, Ltd., Basel, Switzerland. Suitable phenolic resin is available as DUREZ 7031A from Occidental Chemical Corp., DUREZ Division, Dallas, Tex. Suitable anhydrous glycerol is available as product number 2136 from J. T. Baker Chemical Co. of Phillipsburg, N.J. Suitable alumina media is available as BURUNDUM in 6.4 mm rods from Norton Company, Akron, Ohio.

Before pressing, the die was coated with a 1:1 solution of oleic acid in OMS (odorless mineral spirits) to reduce friction between the part and die when the part was ejected. A disc was pressed from about 130 g of this powder at 75 MPa (10,700 psi (60 tons/3.75 in. diameter die)).

The phenolic binder was burned out in a nitrogen atmosphere according to the following schedule:

| | |
|---|---|
| 20° C. | 120 min. |
| 20° C.→600° C. | 180 min. |
| 600° C. | 60 min. |
| 600° C.→20° C. | 180 min. |

The disc was placed in a graphite crucible (equipped with a graphite lid), packed in graphite flake packing material, and fired in an argon atmosphere at about 1631° C. according to the following schedule:

| | |
|---|---|
| 20° C.→1000° C. | 60 min. |
| 1000° C.→1631° C. | 5° C./min. |
| 1631° C. | 60 min. |
| Furnace Cool | 180 min. |

The relative post-pyrolysis and post-firing densities are about 53.5% and about 60.2%, respectively.

After firing, the disc was ground flat on both faces and then ground to a diameter of less than 7.6 cm (3 in.) using a 45 micrometer diamond disc on a grinding wheel. The disc was placed into a 65° C. drying oven overnight to remove the water absorbed during grinding. The disc was then tested as a D.C. Magnetron sputtering target. This disc sputtered very well when tested; it arced only briefly at the beginning of the run. It is believed that increasing the firing temperature increased the bond strength between the particles.

The FeTbCoTa film was deposited by D.C. magnetron sputtering from an alloy target at an Ar pressure of $2\times10^{-3}$ torr. The second amorphous $Y_2O_3$ film was then deposited by the same procedures used to deposit the first amorphous $Y_2O_3$ film. Finally, the Al-Cr reflective layer was deposited from an alloy target at $2\times10^{-3}$ torr of Ar by D.C. magnetron sputtering.

Referring to FIG. 2, the carrier-to-noise ratio data exhibited by the recording medium are plotted as a function of the write power.

EXAMPLE 4

A magneto-optical recording medium was prepared that included a polycarbonate substrate substantially identical to that used in Example 1; a first, 85 nm thick dielectric film composed of amorphous $Y_2O_3$ containing silicon carbide and hafnium oxide as stabilizers; a 23 nm thick FeTbCoTa magneto-optical film; a second, 13 nm thick dielectric film composed of amorphous $Y_2O_3$ containing silicon carbide as the stabilizer; and a 65 nm thick reflective film composed of Al containing 3.7 wt % Cr.

The first dielectric film was prepared by magnetron cosputtering from $Y_2O_3$-10 wt. % SiC and $HfO_2$ targets in a $1\times10^{-3}$ torr Ar working gas atmosphere. A $Y_2O_3$-10 wt. % SiC target, formed by the process of Example 3, was driven by a D.C. power supply, while the $HfO_2$ target was driven by an R.F. power supply. The resulting amorphous mixture contained about 45% $HfO_2$ by volume. The FeTbCoTa film was deposited by D.C. magnetron sputtering from an alloy target at an Ar gas pressure of $2\times10^{-3}$ torr. The second dielectric film was deposited by D.C. magnetron sputtering from the $Y_2O_3$-10 wt. % SiC target used in the first dielectric layer deposition. The final Al-Cr reflective layer was deposited from an alloy target at $2\times10^{-3}$ ton of Ar by D.C. magnetron sputtering.

The recording performance for this Example is similar to that shown in FIG. 2 for Example 3. In addition to excellent recording performance, this example exhibited low bit error rates of less than $1\times10^{-5}$, even after environmental chamber exposure for 1000 hours at 80° C./85% relative humidity.

EXAMPLE 5

A magneto-optical recording medium was prepared that included a polycarbonate substrate substantially identical to that used in Example 1; a first, 85 nm thick, dielectric film composed of amorphous $Tb_2O_3$ containing 20 vol. % silicon carbide as the stabilizer; a 23 nm thick FeTbCo magneto-optical film; a second, 14 nm thick dielectric film having the same composition as the first dielectric film; and a 100 nm thick reflective film composed of Al containing 3.7 wt. % Cr. Magnetron sputtering was used to prepare all film layers in this recording medium.

The first amorphous $Tb_2O_3$ film was prepared by cosputtering from $Tb_2O_3$ and silicon carbide targets; the $Y_2O_3$ target was driven by an R.F. power supply, while a conductive silicon carbide target, as described in U.S. Pat. No. 4,917,970, was driven by a D.C. power supply. An argon working gas pressure of $2\times10^{-3}$ ton was maintained during deposition.

The FeTbCo film was deposited on the first dielectric film by D.C. magnetron cosputtering from elemental Fe, Co, and Tb targets at an Ar pressure of $5\times10^{-3}$ torr. The second amorphous $Tb_2O_3$ film was then deposited by the same procedures used to deposit the first amorphous $Tb_2O_3$ film. Finally, the Al-Cr reflective layer was deposited from an alloy target at $2\times10^{-3}$ torr of Ar.

Figure 3:
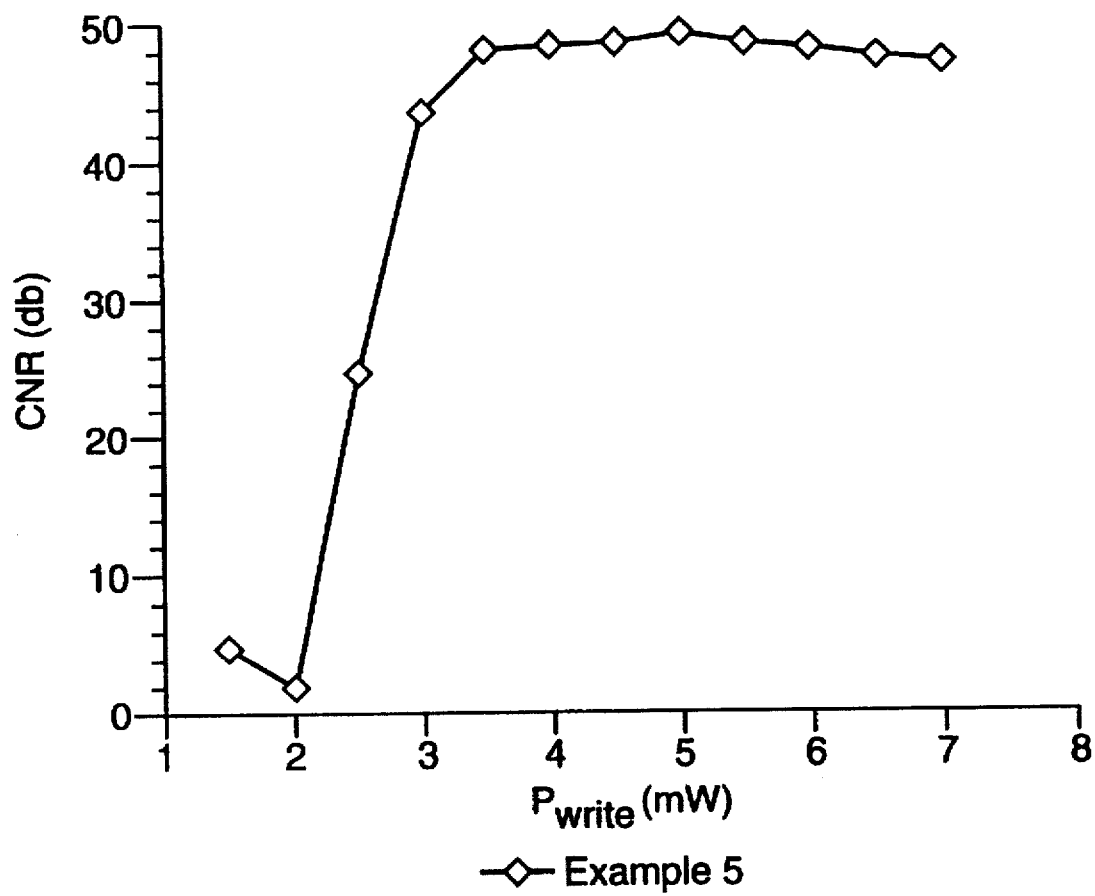

Referring to FIG. 3, the carrier-to-noise ratio data exhibited by the recording medium are plotted as a function of the write power. The following record parameters were used: record frequency, 4.5 MHz; surface velocity, 8.4 M/s; pulse width, 50 ns; $H_{write}$, 250 Oe; $H_{erase}$, −250 Oe; and $P_{read}$, 1 mW.

EXAMPLE 6

Characterization of Rare Earth Oxide Dielectric Films

Ion beam deposition ("ibd"), magnetron sputtering ("mag"), and electron beam evaporation (E.B.) were used to deposit a number of different dielectric films. The resulting film microstructures were examined by transmission electron microcopy (TEM), which revealed that the films could either be crystalline or amorphous depending upon the deposition conditions and film compositions. Some films which appeared amorphous, as deposited, crystallized during observation in the TEM under 200 ke V electron bombardment, and the propensity for crystallization increased by contact with a TbFeCo magneto-optical film. When the rare earth oxides included a sufficient quantity of an appropriate stabilizer, an amorphous film was consistently provided that was stable during TEM observation. The results are summarized in Table 1.

TABLE 1

| Sample | Comp. (vol. %) | Process | Dep. Press., torr. gas | Microstructure | Stable in TEM |
|---|---|---|---|---|---|
| 1 | $Y_2O_3$ | ibd | $2.7\,e^{-4}$ Xe | Amorph. | no |
| 2 | $Y_2O_3$-7% Tb | ibd | $2.7\,e^{-4}$ Xe | Amorph. | no |
| 3 | $Y_2O_3$-10% FeGdCo | ibd | $2.7\,e^{-4}$ Xe | Amorph. | yes |
| 4 | $Y_2O_3$-10% FeTbCo | ibd | $2.7\,e^{-4}$ Xe | Amorph. | yes |
| 5 | $Y_2O_3$-3% FeTbCo | ibd | $2.7\,e^{-4}$ Xe | Amorph. | yes |
| 6 | $Y_2O_3$-7% FeCo | ibd | $2.7\,e^{-4}$ Xe | Amorph. | yes |
| 7 | $Y_2O_3$ | ibd | $2.7\,e^{-4}$ Xe | Amorph. | no |
| 8 | $Y_2O_3$ | R.F. mag | $1.5\,e^{-3}$ Ar | XL | NA |
| 9 | $Y_2O_3$ | R.F. mag | $5.0\,e^{-3}$ Ar | XL | NA |
| 10 | $Y_2O_3$ | R.F. mag | $<4\,e^{-4}$ Ar | XL | NA |
| 11 | $Y_2O_3$ | D.C. mag | $2.0\,e^{-3}$ Ar | Amorph. | no |
| 12 | $Y_2O_3$-10% SiCx | R.F. Mag D.C. Mag | $2.0\,e^{-3}$ Ar | Amorph. | no |
| 13 | $Y_2O_3$-15% SiCx | D.C. Mag | $1.0\,e^{-3}$ Ar | Amorph. | yes |
| 14 | $Y_2O_3$-20% SiCx | R.F. Mag D.C. Mag | $2.0\,e^{-3}$ Ar | Amorph. | yes |
| 15 | $La_2O_3$ | R.F. Mag | $2.0\,e^{-3}$ Ar | XL | NA |
| 16 | $La_2O_3$-20% SiCx | R.F. Mag | $2.0\,e^{-3}$ Ar | Amorph. | yes |
| 17 | $Tb_2O_3$ | R.F. Mag | $2.0\,e^{-3}$ Ar | XL | NA |
| 18 | $Tb_2O_3$-20% SiCX | R.F. Mag D.C. Mag | $2.0\,e^{-3}$ Ar | Amorph. | yes |
| 19 | $Y_2O_3$-10% Si | R.F. Mag D.C. Mag | $2.0\,e^{-3}$ Ar | Amorph. | yes |
| 20 | $Y_2O_3$ | E.B. evap. | $1.0\,e^{-4}$ $O_2$ | Amorph. | no |
| 21 | $Y_2O_3$-20% Si | R.F. Mag D.C. Mag | $2.0\,e^{-3}$ Ar | Amorph. | yes |
| 22 | $Y_2O_3$-33% Si | R.F. Mag D.C. Mag | $2.0\,e^{-3}$ Ar | Amorph. | yes |
| 23 | $Y_2O_3$-50% Si | R.F. Mag D.C. Mag | $2.0\,e^{-3}$ Ar | Amorph. | yes |
| 24 | $Y_2O_3$-50% Si | R.F. Mag D.C. Mag | $2.0\,e^{-3}$ Ar | Amorph. | yes |
| 25 | $Y_2O_3$-8% C | R.F. Mag D.C. Mag | $2.0\,e^{-3}$ Ar | Amorph. | no |
| 26 | $Y_2O_3$-20% C | R.F. Mag D.C. Mag | $2.0\,e^{-3}$ Ar | Amorph. | no |
| 27 | $Y_2O_3$-33% C | R.F. Mag D.C. Mag | $2.0\,e^{-3}$ Ar | Amorph. | yes |
| 28 | $Y_2O_3$-50% C | R.F. Mag D.C. Mag | $2.0\,e^{-3}$ Ar | Amorph. | yes |

Microstructural stability is important to long-term performance stability of MO recording media, and heating by the focussed laser beam during media operation can locally raise media temperature to 300° C. or more during writing and erasure. Consequently, a series of X-ray diffraction—thermal annealing (XRD/TA) studies were undertaken to determine stabilizer addition effects on thermally induced amorphous rare earth oxide crystallization. Specimens for the XRD/TA study were prepared by depositing, in sequence, a ≈20 nm amorphous rare earth oxide layer, a ≈5 nm TbFe or TbFeCo layer, and a ≈80 nm amorphous rare earth oxide layer upon a <100> oriented Silicon crystal wafer. Samples were prepared corresponding to the processes and deposition conditions of sample numbers 1, 5, 13, and 20.

X-Ray diffraction data were obtained in the form of step-scans using a Phillips vertical diffractometer fitted with variable incident beam slits and a graphite diffracted-beam monochrometer. A proportional detector was used to register the scattered radiation. Copper K-alpha incident radiation, generated from a fixed anode tube operating at 45 KV and 40 mA, was employed. Each sample was scanned over a 10 to 65 degree (2 Theta) scattering angle range using a 0.04 degree step size and a 5 second/step counting time. Identification of the crystalline phases present was accomplished by comparing the observed diffraction peaks and relative intensities with both internal X-ray diffraction reference patterns and patterns in the International Centre for Diffraction Data (ICDD) powder diffraction file.

Figure 4:
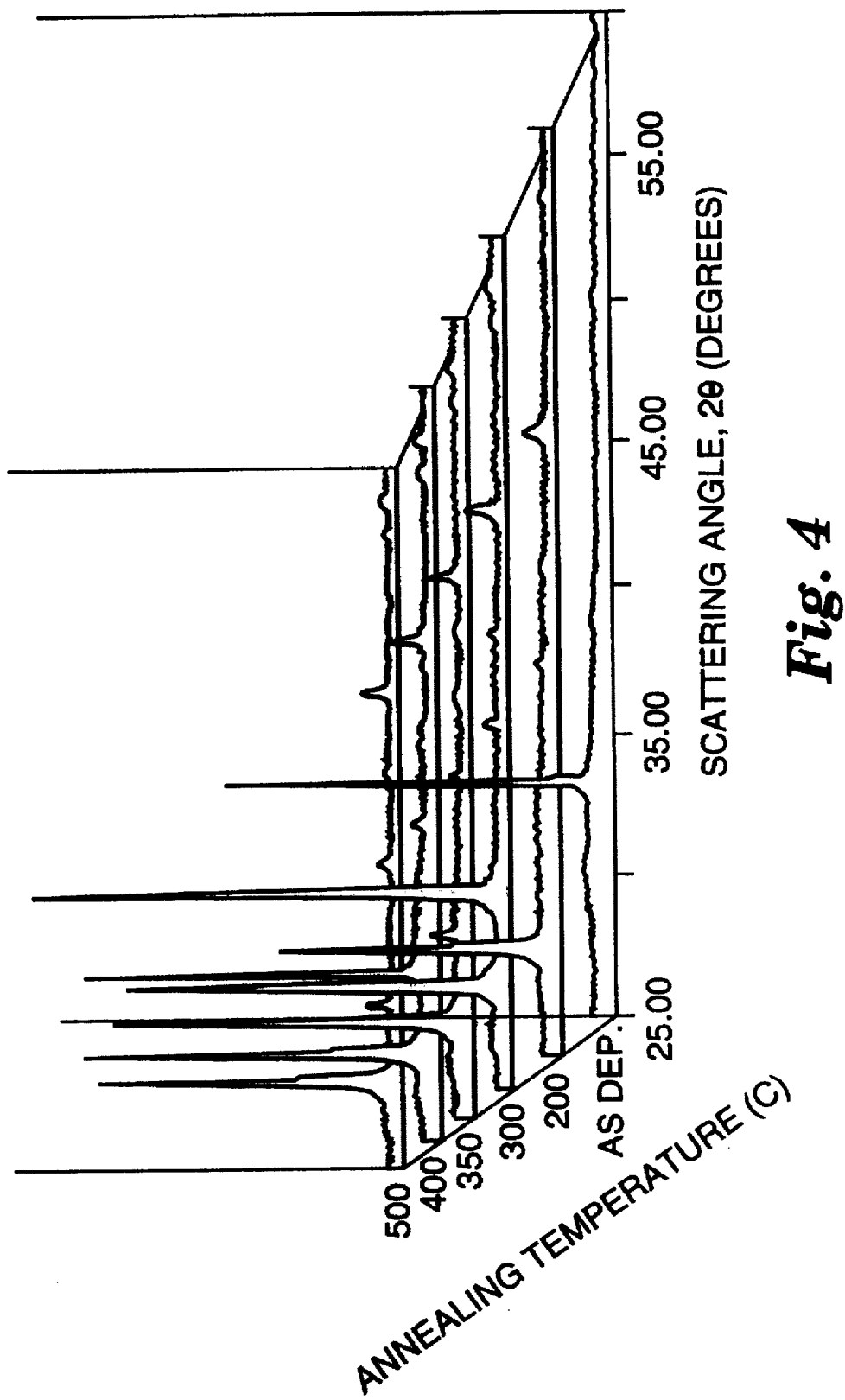
FIGS. 4–6 are plots of x-ray diffraction data as a function of thermal annealing for $Y_2O_3$ films.

Baseline diffraction data were obtained from the as-deposited specimens (corresponding to ≈30° C. exposure). The specimens were then annealed in a box furnace for 1 hour at atmospheric pressure, cooled to room temperature and the X-ray analysis was again performed. The steps of annealing, cooling and X-ray analysis were sequentially repeated at 50° C. temperature increments for annealing temperatures ranging from 200° C. to 500° C. The XRD/TA data for an evaporated $Y_2O_3$ specimen (sample 20) is summarized in FIG. 4. The sharp peak at 2θ≈33 degrees corresponds to a {200} type reflection from the silicon substrate. Referring to FIG. 4, there is no scattered intensity corresponding to crystalline $Y_2O_3$ in the deposited film. However, annealing at only 200° C. causes the appearance of a large peak at 2θ≈29 degrees and a number of other smaller sharp diffraction peaks; these peaks are due to the formation of $Y_2O_3$ crystallites upon annealing.

Figure 5:
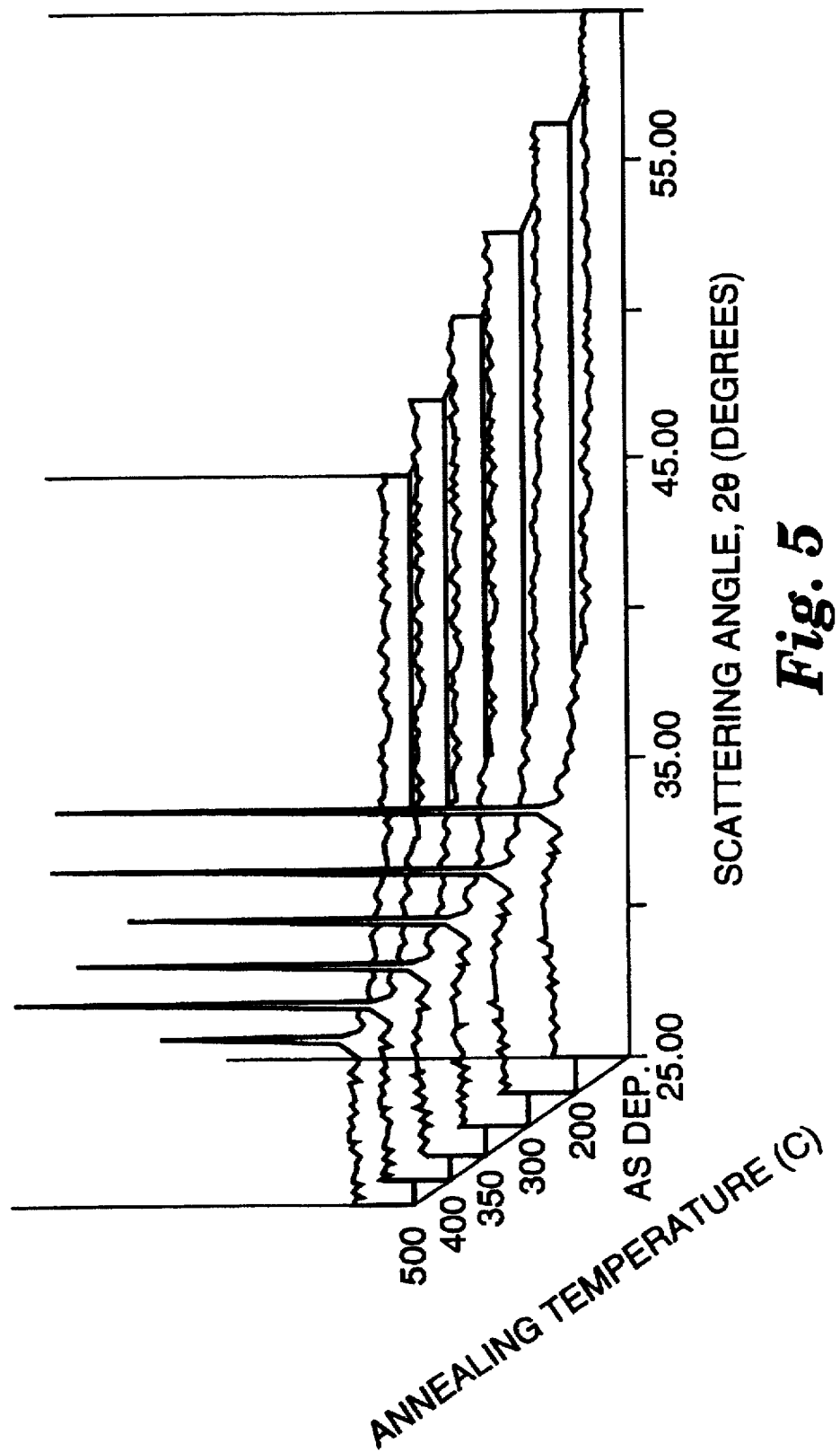

Referring to FIG. 5, for a D.C. magnetron sputtered $Y_2O_3$≈15 vol. % $SiC_x$ mixture (sample 13), there is no evidence for the formation of crystalline $Y_2O_3$ even after 500° C. thermal exposure. The XRD/TA data from sample 5 are not shown, but are substantially identical to FIG. 5. The addition of appropriate stabilizers thus improves amorphous rare earth oxide thermal stability.

Figure 6:
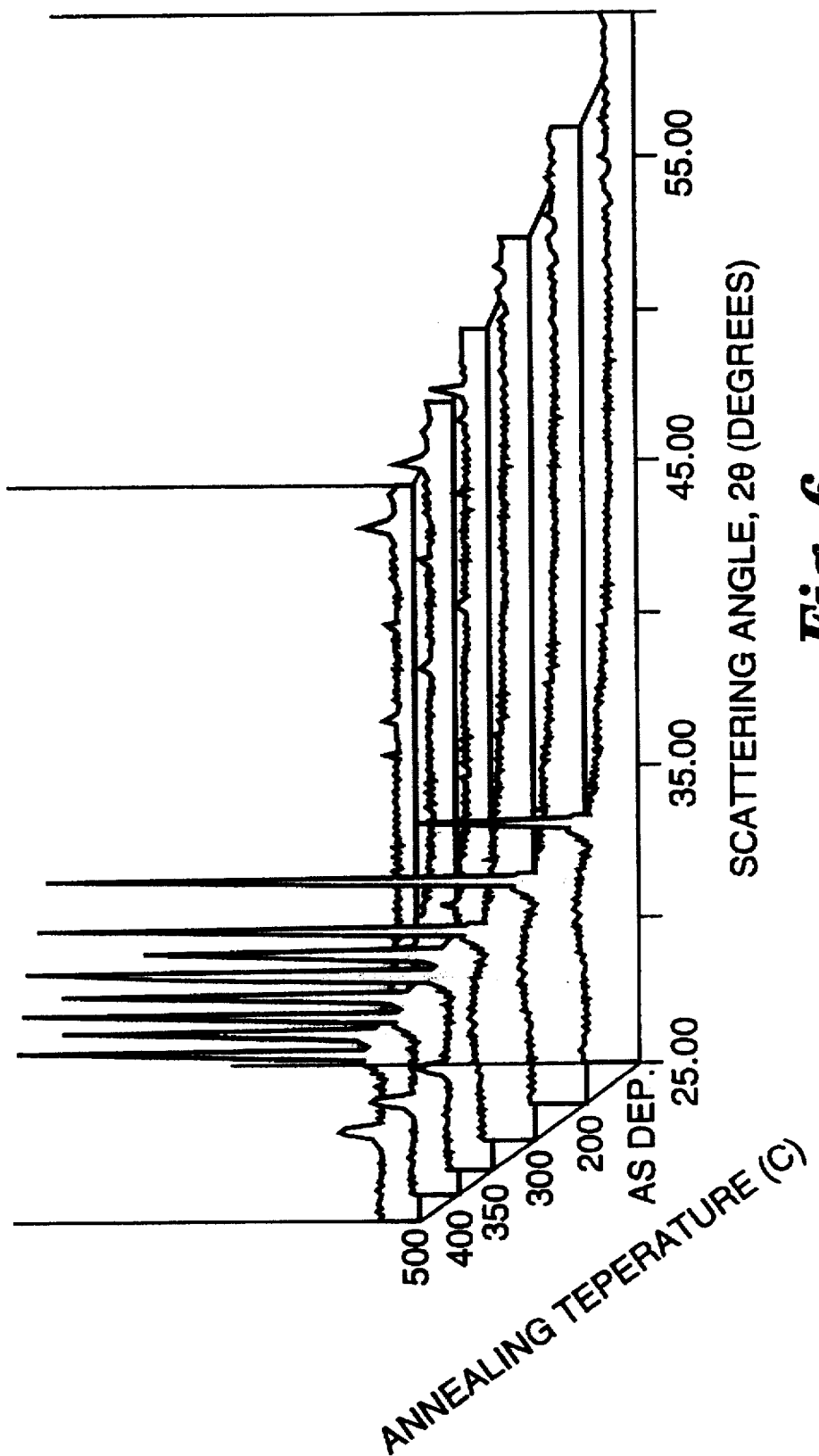

Referring to FIG. 6, the XRD/TA data from sample 1, an ion beam deposited $Y_2O_3$ film, is reported. The film remains amorphous up to an annealing temperature of 350° C.

EXAMPLE 7

Optical Properties

Figure 7:
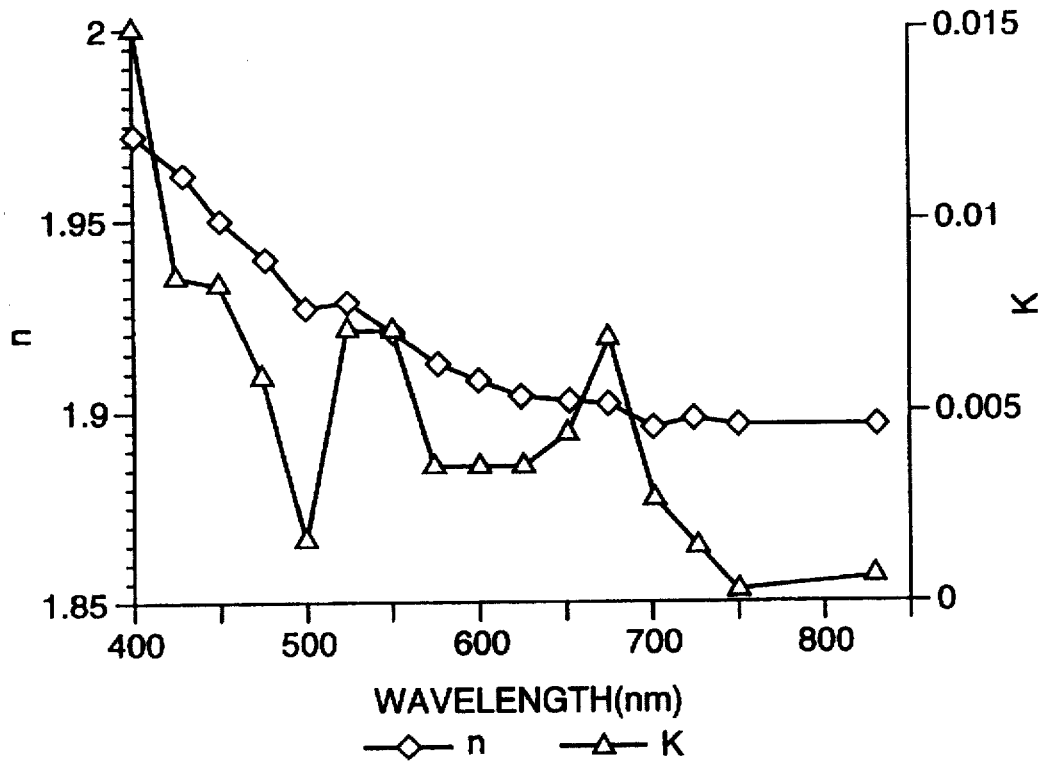
FIG. 7 is a plot of the real (n) and imaginary (k) components of the refractive index of a preferred dielectric film, as a function of wavelength.

The real (n) and imaginary (k) components of the refractive index of an ion beam deposited amorphous $Y_2O_3$ film containing 3% by volume FeTbCo are shown as a function of wavelength in FIG. 7. Adsorption is very low in the 780–830 nm wavelength range commonly used for magneto-optical recording devices, and remains low down into the blue wavelength region.

Figure 8:
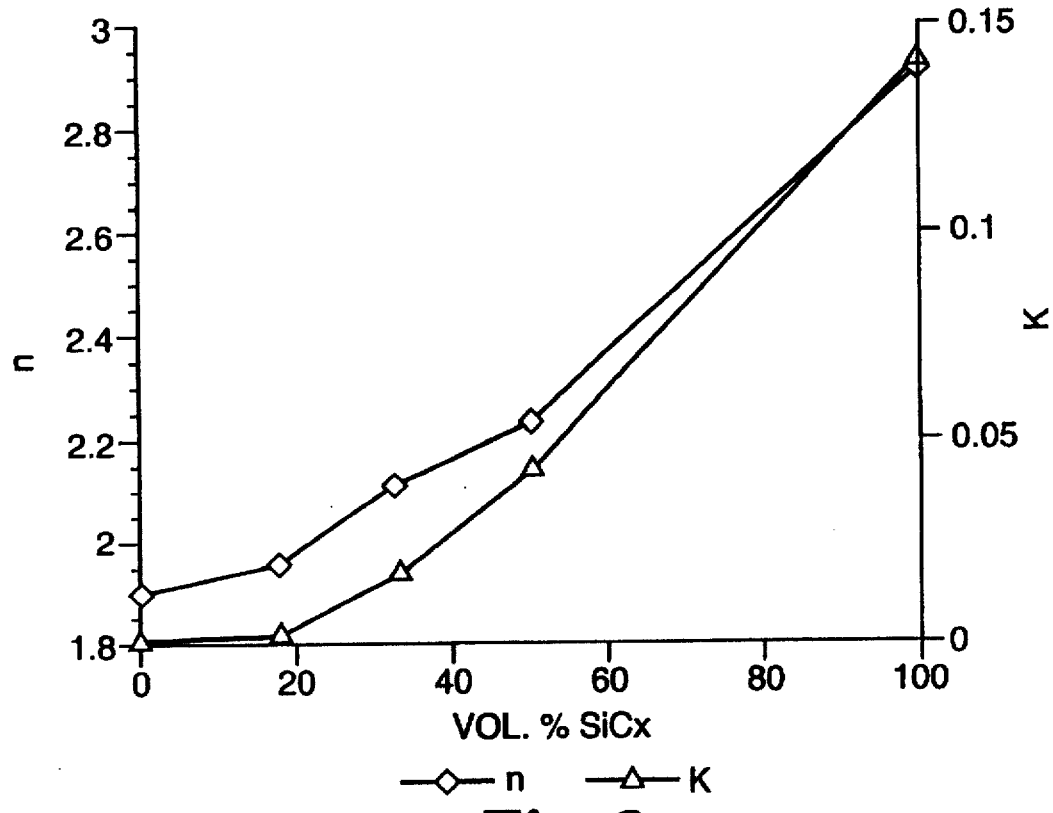
FIG. 8 is a plot of the real (n) and imaginary (k) components of the refractive index of $Y_2O_3$ films including $SiC_x$ stabilizer, as a function of volume fraction of $SiC_x$.

Referring to FIG. 8, the real (n) and imaginary (k) components of the refractive index are shown for amorphous $Y_2O_3$ films containing $SiC_x$ at 830 nm as a function of volume fraction of $SiC_x$. The films were formed by co-deposition using an R.F. magnetron for the $Y_2O_3$ and a D.C. magnetron for the SiCx. All films were deposited at an argon working-gas pressure of 2 m Torr. The adsorption coefficient increases sharply for $SiC_x$ concentrations greater than about 20%. Similar results were observed for the $Y_2O_3$ film containing Si and C discussed in Example 6.

OTHER EMBODIMENTS

Other embodiments are within the claims. For example, the amorphous rare earth dielectric materials described herein are advantageously applicable to alternate magneto-optical media structures such as the direct overwrite structures described in U.S. Pat. No. 5,014,252, which is hereby incorporated by reference, and the high density recording media described in European Patent Application No. 415 449 A2. The materials may also be advantageously utilized for applications such as optical anti-reflection coatings, decorative architectural coatings, and the like.

I claim:

1. A magneto-optical recording medium, comprising a magneto-optical layer, end a dielectric layer comprising at least 51% by volume rare earth oxide and 2 to 49% by volume of a stabilizer for providing resistance to thermally induced crystallization of said dielectric layer, wherein said dielectric layer, when examined by transmission electron microscopy, exhibits a diffuse halo electron diffraction pattern and contains substantially no crystallites larger than 2 nm, thereby indicating said dielectric layer is amorphous, and wherein a film of said dielectric layer having a thickness of $\approx 100$ nm deposited on a TbFeCo film having a thickness of $\approx 5$ nm, after annealing at 300° C. for one hour in air, a 10 degrees$\leq 2\theta \leq 60$ degrees X-ray diffraction scan using copper K-alpha incident radiation of said film of said dielectric layer on said TbFeCo film exhibits no X-ray diffraction peaks corresponding to a crystalline phase of composition, thereby indicating said dielectric layer is stable.

2. The recording medium of claim 1, further comprising a second dielectric layer.

3. The recording medium of claim 1, wherein said rare earth oxide is $Y_2O_3$.

4. The recording medium of claim 1, wherein said rare earth oxide is selected from the group of $La_2O_3$, $Tb_2O_3$, $CeO_x$, ($1 \leq x \leq 1.5$) $Sc_2O_3$, and $Yb_2O_3$.

5. The recording medium of claim 1, wherein said stabilizer is selected from the group consisting of carbon, silicon carbide, and hafnium oxide.

6. The recording medium of claim 1, wherein said stabilizer comprises less than about 30% of said dielectric layer by volume, and said rare earth oxide comprises greater than 70% of said dielectric layer by volume.

7. The recording medium of claim 1, wherein said dielectric layer has a refractive index with a real component of between 1.7 and 2.4.

8. The recording medium of claim 1, wherein said dielectric layer has a refractive index with an imaginary coefficient of less than 0.03.

9. The recording medium of claim 1, wherein said dielectric layer is deposited via non-reactive sputtering.

10. The recording medium of claim 1, wherein said dielectric layer is deposited via D.C. sputtering.

11. A dielectric layer comprising at least 51% by volume rare earth oxide and 2 to 49% by volume of a stabilizer for providing resistance to thermally induced crystallization of said dielectric layer, wherein said dielectric layer, when examined by transmission electron microscopy, exhibits a diffuse halo electron diffraction pattern and contains substantially no crystallites larger than 2 nm, thereby indicating said dielectric layer is amorphous, and wherein a film of said dielectric layer having a thickness of $\approx 100$ nm deposited on a TbFeCo film having a thickness of $\approx 5$ nm, after annealing at 300° for one hour in air, a 10 degrees$\leq 2\theta \leq 60$ degrees X-ray diffraction scan using copper K-alpha incident radiation of said film of said dielectric layer on said TbFeCo film exhibits no X-ray diffraction peaks corresponding to a crystalline phase of composition, thereby indicating said dielectric layer is stable.

12. The dielectric layer of claim 11, wherein said rare earth oxide is $Y_2O_3$.

13. The dielectric layer of claim 11, wherein said rare earth oxide is selected from the group of $La_2O_3$, $Tb_2O_3$, $CeO_x$ ($1 \leq x \leq 1.5$), $Sc_2O_3$, and $Yb_2O_3$.

14. The dielectric layer of claim 11, wherein said stabilizer is selected from the group consisting of carbon, silicon carbide, and hafnium oxide.

15. The dielectric layer of claim 11, wherein said stabilizer comprises less than about 30% of said dielectric layer by volume, and said rare earth oxide comprises greater than 70% of said dielectric layer by volume.

16. The dielectric layer of claim 11, wherein said dielectric layer has a refractive index with a real component of between 1.7 and 2.4.

17. The dielectric layer of claim 11, wherein said dielectric layer has a refractive index with an imaginary coefficient of less than 0.03.

18. The dielectric layer of claim 11, wherein said dielectric layer is deposited via non-reactive sputtering.

19. The dielectric layer of claim 11, wherein said dielectric layer is deposited via D.C. sputtering.

20. A composition comprising at least 51% by volume rare earth oxide and 2 to 49% by volume of a stabilizer for providing resistance to thermally induced crystallization of said composition, wherein said composition is a film, and wherein said composition, when examined by transmission electron microscopy, exhibits a diffuse halo electron diffraction pattern and contains substantially no crystallites larger than 2 nm, thereby indicating said composition is amorphous, and wherein a film of said composition having a thickness of $\approx 100$ nm deposited on a TbFeCo film having a thickness of $\approx 5$ nm, after annealing at 300° C. for one hour in air, a 10 degrees$\leq 2\theta \leq 60$ degrees X-ray diffraction scan using copper K-alpha incident radiation of said film of said composition on said TbFeCo film exhibits no X-ray diffraction peaks corresponding to a crystalline phase of composition, thereby indicating said composition is stable.

21. The composition of claim 20, wherein said rare earth oxide is $Y_2O_3$.

22. The composition of claim 20, wherein said rare earth oxide is selected from the group consisting of $La_2O_3$, $Tb_2O_3$, $CeO_x$, $Sc_2O_3$ and $Yb_2O_3$, wherein $1 \leq x \leq 1.5$.

23. The composition of claim 20, wherein said rare earth oxide comprises a mixture of rare earth oxides.

24. The composition of claim 20, wherein said stabilizer is selected from the group consisting of carbon, silicon carbide, and hafnium oxide.

25. The composition of claim 20, comprising in the range from 3 to 30% of said stabilizer by volume.

* * * * *